June 10, 1947.  S. RUBEN  2,422,046
ALKALINE DRY CELL
Filed Dec. 10, 1943  2 Sheets-Sheet 1
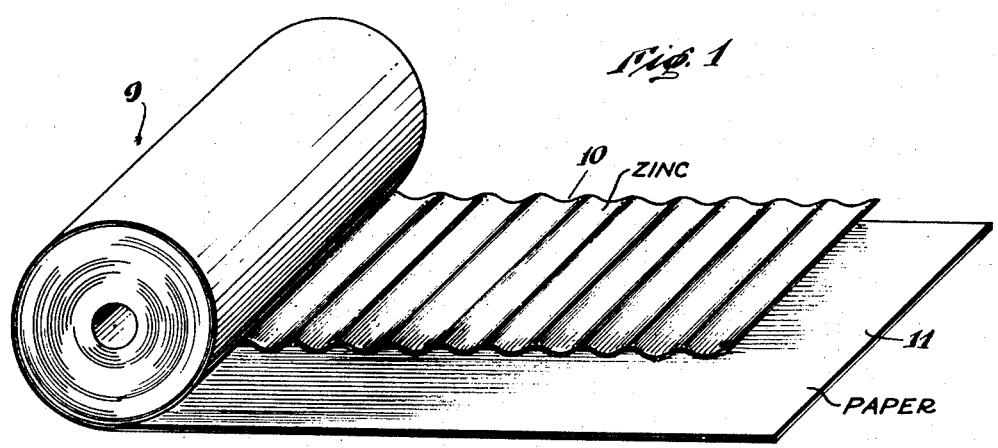
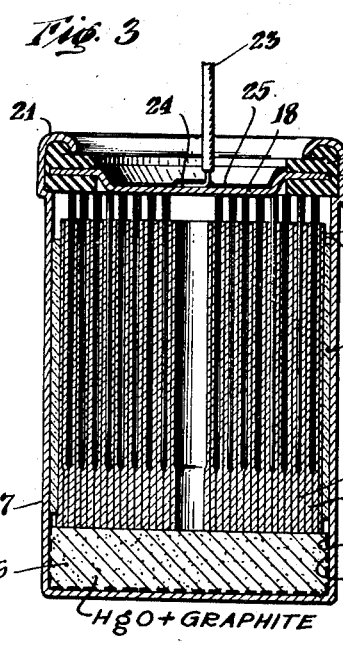
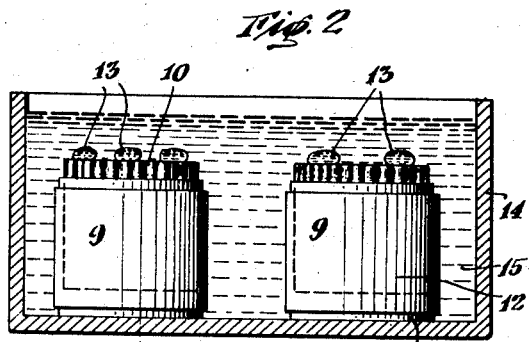
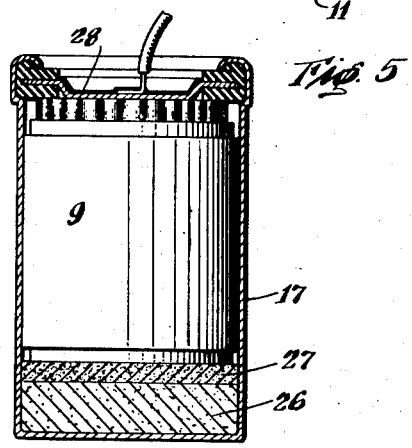
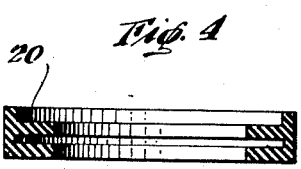
INVENTOR.
Samuel Ruben
BY
Robbin & Carlson
ATTORNEYS

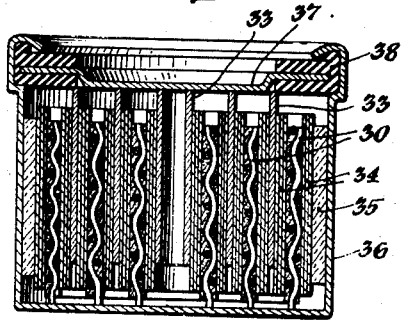
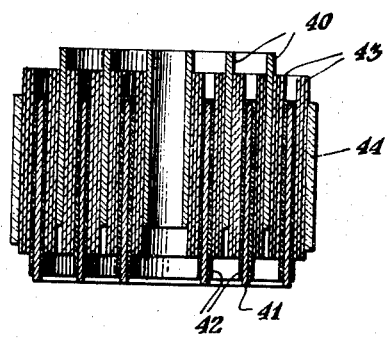
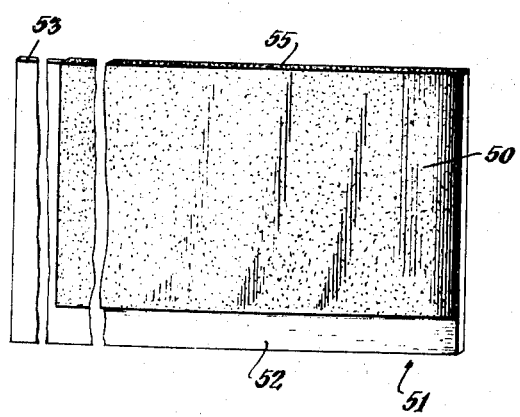
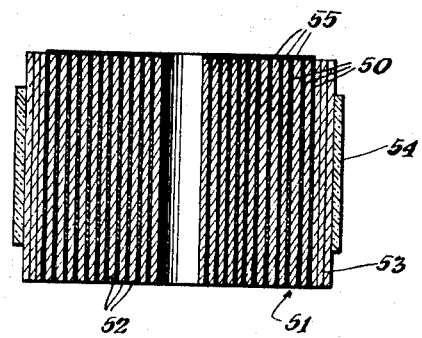

Patented June 10, 1947

2,422,046

UNITED STATES PATENT OFFICE 2,422,046

ALKALINE DRY CELL

Samuel Ruben, New Rochelle, N. Y.

Application December 10, 1943, Serial No. 513,687

15 Claims. (Cl. 136—107)

This invention relates to primary electric cells, their construction, composition and manufacture.

An object is to improve primary cells and methods of making them.

Other objects of the invention will be apparent from the description and claims.

In the drawing:

Figure 1 is a perspective view showing a step in the manufacture of a primary cell electrode;

Figure 2 shows a method of amalgamating a zinc electrode;

Figure 3 is a longitudinal section through a completed cell;

Figure 4 is a section of the pliable sealing grommet therefor;

Figure 5 is a sectional view of a modified cell;

Figure 6 is a cross-section of a depolarizing electrode of modified form;

Figure 7 is a section through a primary cell of a construction embodying the electrode of Figure 6;

Figure 8 is a section through an anode-cathode-spacer construction of further modified form;

Figure 9 shows an integral anode and spacer sheet; and

Figure 10 shows the wound anode assembly made from the sheet of Figure 9 ready for impregnating with electrolyte.

In its preferred embodiment the invention is applied to a primary cell having an anode of zinc or its equivalent, an alkaline electrolyte and a depolarizing electrode formed of an oxidizing agent, for example mercuric oxide or cupric oxide.

Alkaline electrolyte cells have not heretofore been successfully used as small portable general utility batteries or "dry cells" due to their tendency to undergo chemical changes on shelf life resulting in the production of gas, which will build up to dangerous pressures if the cells are hermetically sealed. These chemical reactions proceed rapidly at elevated temperatures such as are encountered in the warmer climates and in heated enclosures.

Venting of the cells is impractical due to the resulting leakage of electrolyte, evaporation, reaction with carbon dioxide, and increased corrosion of the zinc electrode when exposed to the joint action of air and alkalies.

Moreover, under conditions where elevated temperatures are encountered the cells deteriorate so rapidly, whether sealed or vented, as to be useless in a short time.

I have now been able to produce a hermetically sealed primary cell which has no tendency to generate gas during use or on shelf life, which has a higher ampere hour capacity for a given volume than prior art dry cells, and which has a long life under extreme temperature conditions.

A factor in producing this improvement resides in the use of an alkaline electrolyte, such as a KOH solution, substantially saturated with alkali metal zincate prior to use. This is described and claimed in my copending application Serial Number 604,269, filed July 10, 1945.

I have found that the following supplementary factors contribute to the production of a cell of the highest quality:

1. All materials and parts should be pure and free from active soluble salts or other impurities.

2. All zinc parts, such as the zinc electrode and zinc terminal or cover, should be amalgamated with mercury, at least on their surfaces, and preferably heat treated to distribute the mercury throughout the elements.

3. The container or support for the depolarizer should be a material inert to the electrolyte, such as steel or nickel or carbonized iron.

4. Any spacers and wrappers used should be alkali resistant to avoid deleterious reactions, gas generation, and deterioration of the spacers and wrappers during manufacture and use of the cells.

5. After impregnation of the cell electrode units and/or spacers, excess electrolyte should be drained off to leave only the quantity of electrolyte which is retained by the absorbent spacers.

Where the cells are intended for use or storage under high temperature conditions, such as are encountered in the warmer climates, in the holds of ships and other storage places and in certain industrial, military and consumer uses, where temperatures of 140° F. may be encountered, for example, the following additional factors are of importance:

(a) The depolarizer should be substantially insoluble in the electrolyte at the elevated temperature. Mercuric oxide is the preferred depolarizer for this use.

(b) Paper or other porous spacer material should be present between the zinc electrode and the depolarizer electrode in a thickness of at least 20 mils to allow adequate barrier action and reduce any tendency of progressive reduction of the oxide by the zinc during storage at elevated temperatures.

(c) The insulating sealing means, such as neoprene, should be non-porous and preferably held under compression to prevent any substantial creepage or leakage of electrolyte. The sealing material should also be thoroughly dry and free from salts.

(d) Unless the cell is assembled in a battery which is wax impregnated, the outer zinc surfaces should be amalgamated and should also be provided with an alkali resistant coating lacquer or cadmium plated to prevent corrosion or carbonation of the zinc due to the joint action of any residual or creepage electrolyte together with air.

(e) The electrolyte should be filtered free of any suspended matter.

Figure 1 shows a preferred method of making an anode spacer assembly. According to this method a strip of corrugated zinc foil 10 which has been cleaned thoroughly in ammonium hydroxide and washed into a roll 9 with an interleaved spacer formed of a double layer of alkali resistant paper 11. By way of example, the anode may be formed of a strip of zinc foil 13 inches by 3/32 inch by .002 inch corrugated to an over-all thickness of .004 to .005 inch.

The paper strips may be, for example, 15 inches by 3/8 inch by .002 to .004 inch. One paper which has been found to be suitable is Dexter paper produced from mixed hemp and wood fibres which are treated with a solution of sodium hydroxide in the pulp stage. This produces a reaction of the alkali with part of the paper constituents and results in a paper which is resistant to alkalies and hence will not be greatly weakened by the alkali electrolyte to be used in the primary cell. Jute and cotton fibre papers may also be used for the strips 11 and in some cases may be of sufficient purity or alkali resistance so that the alkali treatment of the pulp may not be required.

The zinc foil and paper strips are wound into the roll 9 in such a manner that one edge of the zinc foil projects approximately 10 to 15 mils at one end of the roll, although a larger margin can be tolerated if desired. The paper preferably projects about 3/32 inch beyond the zinc at the other end of the roll. The paper strip also extends beyond the end of the zinc strip so as to provide at least one complete extra turn of paper on the outside of the roll.

A sleeve 12 is then slipped over the dry roll to hold it assembled. The sleeve may be formed of a Pliofilm strip 3/8" wide by .004 inch thick which is heat-sealed into a ring. The sleeve may in some cases be formed of other material such as Koroseal, polystyrene or other alkali resistant plastics.

For cells of this type it is desirable to amalgamate the surface of the zinc with mercury. However, if mercury is applied before winding the zinc becomes brittle and rolling is made difficult or impossible. Figure 2 shows a process of impregnating the anode assemblies with electrolyte accompanied by amalgamation after rolling. A number of the anode-spacer assemblies 9 are placed in a flat bottom dish 14 with the zinc end up. The cell electrolyte 15 is poured into the dish slowly allowing the electrolyte to be drawn up into the rolls by capillarity. The porous paper absorbs the electrolyte and swells into the space afforded by corrugation of the zinc foil.

Electrolyte is added until approximately 1/8 inch above the tops of the rolls and a measured quantity of mercury 13 is introduced on top of the rolls in contact with the zinc. The amount of mercury used will depend on the area of the zinc and is determined by calculation or experiment. Preferably about 1/3 of the mercury is placed at the center and 2/3 near the outer edge. The dish is then covered and placed in an oven at 60° C. for several hours. For example, 12–16 hours. This permits the mercury to spread over the entire zinc foil surface and completely amalgamate it. With the preferred electrolyte described in my co-pending application, anode assemblies may be held in the electrolyte in this condition for several days, if required, without damage.

While the zinc electrode will not dissolve appreciably or generate gas in the zincate electrolyte described in my copending application, the contact of the zinc with the paper and electrolyte produces a slight preliminary reaction between the zinc or zinc hydroxide and the cellulose of the paper and a small amount of gas is generated due to contact effects if the zinc is not amalgamated. After amalgamation this effect is negligible. Moreover, by the heat treatment in the electrolyte prior to final assembly any preliminary gas which may be generated escapes so that the final assembly will be gas free.

Just before assembly the excess electrolyte is drained from the anodes for several minutes on an absorbent surface under moderate vacuum such as 2 cm. of Hg, which also extracts entrapped gas bubbles. If desired the roll may be vacuum impregnated with fresh electrolyte after draining and again drained. About 1.23 grams of electrolyte is retained in the drained roll.

The depolarizing electrode 16 comprises an oxide composition which is pressed as a compact layer or pellet into the bottom of an iron or steel cup 17 to form the cathode-container sub-assembly. A mercuric oxide-graphite mixture is preferred but cupric oxide may be substituted for the mercuric oxide for moderate temperature applications. The bottom and lower inside walls of the cup are first painted with a graphite suspension 60 which promotes good electric contact and prevents polarization effects between the depolarizer and the container wall.

When ready for assembly of the complete cell the anode-spacer roll 9 is inserted in the cup, zinc end up. The roll is pressed down so that the paper 11 makes contact with the top surface of the depolarizer cathode 16.

The top 18 which forms the cover and the negative terminal of the cell comprises a 40 mil thick zinc disc drawn into a shallow dished or pie-pan shape as is clearly seen from Figure 3. Before assembly of the cell the top 18 is dipped into a solution of 2% mercuric nitrate and 5% nitric acid to amalgamate it, then rinsed and baked for 6 hours at 60° to 70° C. The top is fitted into a washed pliable neoprene ring or grommet 20 molded with the cross-section illustrated in Figure 4. The top and sealing ring assembly is then placed in the top end of can 17 with the edge of grommet 20 resting on shoulder 22 formed in the can wall and free edge 21 of the can is then spun firmly down over the top edge of the grommet. The top 18 makes pressure contact with the upper end of zinc anode foil 10 and, since both are amalgamated an amalgam joint is formed. Sufficient air space remains in the cell to prevent a high hydrostatic pressure from developing under high temperature conditions. Before use the grommet is thoroughly washed under vacuum to remove impurities and gases. If desired it may also be impregnated with oil or wax.

In most cases a wire terminal 23 is secured by solder 24 to the center of the top. A top coating 25 of alkali resistant lacquer is applied to protect the outside surface of the zinc. Cadmium plating may also be used.

As one example of a cell constructed according to the invention and using a zinc foil strip .002 inch thick, 9/32 inch wide and 13 inches long as described above and corrugated with about 50 corrugations per inch, with two layers of porous Dexter paper each .004 inch tick, 12/32 inch wide and 15 inches long, the cup 17 has an inside diameter of ½ inch and a depth of about ½ inch exclusive of the flange 21. Two grams of the preferred depolarizer material consisting of 90% mercuric oxide and 10% micronized graphite mixture is pressed in the bottom of the cup resulting in a layer approximately .09 inch thick. The paper 11 being soft and porous, swells and expands to close the space between turns at the bottom end of the anode roll so that all electrolytic conduction in the cell is through electrolyte held absorbed in the paper.

By way of example only, one electrolyte of the type described in my copending application which can be used is formed by dissolving 75 grams KOH in 100 ml. of water at 110° C. with an excess of zinc oxide until the electrolyte appears to be saturated therewith, then cooling and vacuum filtering through a fine grain glass filter so that a clear solution is obtained.

In one case the electrolyte was made by adding 450 grams C. P. KOH to 600 cc. of distilled water and stirred until completely dissolved. During solution the temperature rose to 110°–115° C. due to the heat of solution. At this temperature 80 grams of C. P. ZnO was added and the solution was thoroughly stirred until cool. Excess zinc oxide settled out and the clear solution was decanted and filtered through a ceramic filter so that a particle-free clear solution was obtained. The resulting electrolyte solution analyzed:

|  | Grams per liter |
|---|---|
| KOH | 637 |
| Zinc | 66.5 |

(Equivalent zinc oxide 82.5 grams per liter.)

It is believed that the following expresses the reactions which take place in the cell during current generation, in a cell having a zinc anode, a HgO cathode and an electrolyte of KOH solution saturated with $K_2ZnO_2$ (the symbol F as used in the following formulas indicates one faraday):

At anode:

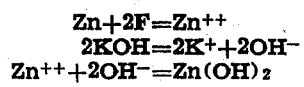
$$Zn + 2F = Zn^{++}$$
$$2KOH = 2K^+ + 2OH^-$$
$$Zn^{++} + 2OH^- = Zn(OH)_2$$

At cathode:
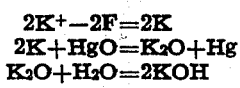
$$2K^+ - 2F = 2K$$
$$2K + HgO = K_2O + Hg$$
$$K_2O + H_2O = 2KOH$$

These add up to:
$$Zn + KOH, H_2O + HgO = Zn(OH)_2 + Hg + KOH$$

As the electrolyte is already saturated with the zincate the zinc hydroxide formed at the anode during current generation remains adhering thereto as a porous layer. The porosity of the layer permits the electrolytic current path to reach the zinc until the layer builds up to a certain thickness. By using a zinc electrode of large surface area the resistance of the electrolyte path remains low until the layer reaches a substantial thickness and most of the zinc and depolarizer have been consumed.

It will be noted that the KOH is regenerated in the cell reactions so that it remains substantially constant in amount during the life of the cell. This cell has an open circuit voltage of about 1.34. Using 2 grams of oxide for the depolarizer it has 24 hours' life under a 20 milli-ampere load. It exhibits negligible change in output after 2 months on shelf life at 140° F.

Figure 5 illustrates a modified cell wherein the compact in the bottom of the container includes an inert microporous barrier disc 27 which is pressed on top of the depolarizer 26. Barrier 27 may be a porous ceramic material which is inert to the electrolyte. This construction is desirable when the depolarizer consists of cupric oxide or other oxides which have a tendency to migrate to the anode at elevated temperatures. The paper 11 itself affords substantial protection against migration under normal conditions but the barrier disc improves the protection where extreme temperature conditions or long shelf life are encountered. A sufficiently fine barrier may be used to retard migration effects even where these effects involve actual solution of a small amount of the depolarizing oxide.

In cases where cells of the highest current capacity and lowest internal resistance are required, and for low temperature operation where the electrical conductivity of the electrolyte is lower, it is desirable to provide a short electrolyte path of large area. Figure 7 shows a cell construction embodying this advantage which uses a depolarizing electrode formed of steel wire mesh filled with the depolarizing oxide composition as shown in Figure 6.

The depolarizing electrode may be made, for example, by coating 30 x 30 mesh steel screen 31 formed of 10 mil wire with a depolarizer composition 32 formed from 25 grams mercuric oxide containing 10% graphite by weight and mixed with 5 grams of a binder such as a solution of Koroseal. The depolarizer compound may be spread onto the wire mesh with a spatula and baked for 2 hours at 120° C. to volatilize the solvent. The coated mesh is then rolled smooth between steel rolls under 5,000 pounds' pressure. The resulting sheet is cut into electrode strips.

The coated wire mesh strips 30 are then wound into a roll with a zinc foil strip 33 from which it is spaced by interposed paper spacers 34 as seen from the cross-section in Figure 7. A Pliofilm band 35 holds the roll together and it is then impregnated with electrolyte. The zinc foil 33 may be amalgamated after winding into the assembly.

The paper spacers 34 are each preferably formed of three or four layers of paper and the total thickness of each spacer must be at least 20 mils as I have found that less spacing between the opposite electrodes results in internal discharge when cell is at elevated temperatures.

The impregnated roll is inserted in a steel can 36 as shown in Figure 7 and top assembly comprising top 37 and grommet 38 similar to those previously described is pressed down on the roll and the edge of the steel cup 36 is spun over the grommet to compress it and seal the cell. During winding the zinc foil strip 33 is offset in one direction and the depolarizer electrode strip 30 in the opposite direction with respect to the paper spacers 34 so that the zinc foil projects at one end of the roll and the depolarizer electrode 30 projects at the other end of the roll. Upon assembly in the cell the edge of the zinc foil strip is then in pressure contact with the top 37 and the depolarizer electrode is in direct pressure contact with the bottom of cup 36. It is preferred that the depolarizer compound be removed from the edge of the depolarizer electrode to afford direct metal-to-metal contact between the ends of the mesh wires and the bottom of the steel cup.

Figure 8 illustrates another modified electrode-spacer assembly which is generally similar to the assembly of Figure 7 but has a depolarizer electrode formed of a thin strip of sheet steel coated with the depolarizer composition. This assembly comprises a zinc foil electrode 40 and steel sheet electrode 41 coated with the depolarizer composition 42 and spaced from the zinc electrode by multi-layer paper spacers 43. The two electrodes are offset so as to project from opposite ends of the roll and make contact with cup and top respectively. The depolarizer 42 may be applied to the steel sheet by spraying, spreading, painting or other methods and the strip may be rolled to compact the depolarizer layer if desired. A Pliofilm band 44 holds the roll together.

Figure 9 illustrates a further modification wherein the zinc electrode comprises a sprayed metal layer 50 on a paper strip 51. The zinc is applied to the paper with a metal spray gun such as a Schoop gun which atomizes zinc wire or a Schori gun which sprays zinc powder. Instead of pure zinc a zinc-mercury amalgam may be sprayed onto the paper, from an amalgam wire or powder.

The metal layer may be applied to one or both sides of the paper, but one edge of the paper is preferably protected or masked during spraying to leave an uncoated margin 52 along one edge of the paper strip. Margin 52 may preferably be about $\frac{3}{32}$ inch wide. It is also desirable in some cases to leave a section 53 at one end of the paper strip uncoated so that when the electrode-spacer unit is wound into a roll the paper will make one or more complete turns on the outside of the roll to insure insulation of the electrode from the metal container. Instead of leaving end section 53 bare during spraying it is of course possible to wrap a strip of paper around the outside of the roll after it is wound. It is also possible to spray the zinc or amalgam onto cloth or on regenerated sheet cellulose, which can absorb electrolyte and serve as a spacer.

Figure 10 shows an anode roll suitable for use in the cell of Figure 3 or Figure 5 formed from the electrode-spacer sheet of Figure 9. It will be noted that the sprayed zinc layer which extends to one edge of the paper strip at 55 is thereby enabled to make direct contact with the zinc top for terminal purposes when assembled in the primary cell. A Pliofilm band 54 holds the roll together.

While specific embodiments of the invention have been described, it is intended to cover the invention broadly within the spirit and scope of the appended claims.

What is claimed is:

1. A primary cell comprising a container, a compact in the bottom of said container including a depolarizing electrode, an anode-spacer structure in said container comprising a roll of anode metal foil interleaved with absorbent sheet spacer material, the edge of said foil projecting at a first end of said roll and spacer material projecting at the second end of said roll, and electrolyte absorbed in said spacer material, said second end of said roll pressing against the top of said compact, and a metal top for said container pressing against the first end of said roll, said top being insulated from said depolarizing electrode.

2. A primary cell comprising a cylindrical metal cup, a compact including a depolarizing electrode pressed into the bottom of said cup and having a substantially plane upper surface, and an anode-spacer structure in said cup comprising a roll of anode metal foil strip interleaved with porous organic sheet spacer material strip, the edge of said foil strip projecting at a first end of said roll and spacer material projecting at the second end of said roll, and electrolyte absorbed in said spacer material, said second end of said roll pressing against the top of said compact, a metal disc top for said cup pressing against the first end of said roll, an insulating sealing ring covering the outer edge of said disc top and the free edge of said cup being spun over said sealing ring.

3. A primary cell comprising a cylindrical metal cup, a compact including a depolarizing electrode pressed into the bottom of said cup and having a substantially plane upper surface, and an anode-spacer structure in said cup comprising a roll of anode metal foil strip interleaved with porous organic sheet spacer material strip, the edge of said foil strip projecting at a first end of said roll and spacer material projecting at the second end of said roll, and electrolyte absorbed in said spacer material, said second end of said roll pressing against the top of said compact, a metal disc top for said cup pressing against the first end of said roll, an insulating sealing ring covering the outer edge of said disc top and the free edge of said cup being spun over said sealing ring, said disc top being formed of the same metal as said anode.

4. A primary cell comprising a cylindrical metal cup, a depolarizing oxide composition pressed into the bottom of said cup and having a substantially plane upper surface, and an anode-spacer structure in said cup comprising a roll of zinc foil strip interleaved with porous paper strip, the edge of said foil strip projecting at a first end of said roll and the edge of said paper strip projecting at the second end of said roll, and alkaline electrolyte absorbed in said spacer material, said second end of said roll pressing against said depolarizing electrode, a zinc disc top for said cup pressing against the first end of said roll, an insulating sealing ring covering the outer edge of said disc top and the free edge of said cup being spun over said sealing ring.

5. A primary cell comprising a container, a roll in said container comprising interleaved strips of metal foil and porous sheet material, said strips being offset so that said foil projects at a first end of said roll and said porous sheet material at the second end thereof, and a terminal for said cell secured in the mouth of said container and pressing against said first end of said roll.

6. A primary cell comprising a container, a first electrode in the bottom thereof, a roll in said container comprising interleaved layers of electrode and spacer material, said layers being offset so that an electrode layer projects at the upper end of said roll, and a conductive top on said container insulated from said first electrode, said roll being held between said top and said first electrode solely by pressure contact, the ends of said roll being parallel to said top and the bottom of said container.

7. A primary cell comprising a metal container, a first electrode in the bottom thereof, a roll in said container comprising interleaved layers of electrode and spacer material, said layers being offset so that an electrode layer projects at the upper end of said roll, and a conductive top on said container insulated from said container, said roll being held under pressure between said top and said first electrode, the upper end of said roll being in face to face contact with said top.

8. A primary cell comprising a conductive container, a roll in said container comprising interleaved layers of a first electrode material and a spacer material, said layers being offset so that said electrode material projects from a first end of said roll, a terminal in contact with said projecting electrode material, said porous spacer material extending beyond said first electrode material at the second end of said roll, and electrolyte absorbed in said spacer material, and a second electrode material in contact with said electrolyte adjacent to the second end of said roll and also in contact with said container.

9. A primary cell comprising a cylindrical metal can, a body of powdered electrode material pressed in the bottom of said can, and an electrode roll in said can and co-axial therewith comprising interleaved layers of a second electrode material and a spacer material, said layers being offset so that said electrode layer projects at the top and said spacer projects at the bottom of said roll, the bottom of said roll being in pressure contact with said body of powdered electrode material, an electrolyte absorbed in said spacer, and a conductive top for said can but insulated therefrom, said top making pressure contact with said projecting electrode layer.

10. A primary cell comprising a container, a roll in said container comprising a pair of electrode strips interwound with and spaced apart by interposed strips of porous spacer material, said strips being offset so that an edge of one of said electrode strips projects at one end of said roll and the other electrode strip projects at the other end of said roll, and a pair of conductive terminals in contact with the two ends of said roll, said roll being held interposed between said terminals by pressure.

11. A primary cell comprising a container, a roll in said container comprising a pair of electrode strips interwound with and spaced apart by interposed strips of porous spacer material, said strips being offset so that an edge of one of said electrode strips projects at one end of said roll and the other electrode strip projects at the other end of said roll, said container being formed of conductive material and a conductive top for said container insulated therefrom, said roll being held under pressure between said top and the bottom of said container with one electrode in pressure contact with said top and the other in pressure contact with said bottom.

12. A primary cell comprising a cylindrical metal can, an electrode roll in said can and co-axial therewith comprising a pair of electrode strips interwound with and spaced apart by interposed strips of porous spacer material, said strips being offset so that an edge of one of said electrode strips projects at one end of said roll and the other electrode strip projects at the other end of said roll, a conductive top disc for said can surrounded at its outer edge by a layer of insulating sealing material, the top edge of said can being formed over said insulating layer to seal the cell, said top making pressure contact with one end of said roll and the other end of said roll making pressure contact with the bottom of said can.

13. A primary cell anode unit comprising a strip of absorbent sheet material and a conductive spray-deposit of zinc thereon, said strip having an uncoated margin along one edge, and said zinc extending to the other edge of said strip, said strip being wound into a roll wherein zinc is exposed at one end and absorbent sheet material free of zinc at the other end.

14. A primary cell comprising a container, a roll in said container comprising a pair of electrode strips interwound with and spaced apart by interposed strips of porous spacer material, said strips being offset so that an edge of one of said electrode strips projects at one end of said roll and an edge of the other electrode strip projects at the other end of said roll, and a pair of conductive terminals in contact with the two ends of said roll, one of said electrode strips comprising amalgamated zinc and the other of said electrode strips comprising a ferrous metal base coated with a conductive depolarizer composition.

15. A primary cell structure comprising a metal cup having a depolarizing oxide cathode compressed in the bottom thereof, and an anode formed of a roll of foil and an electrolyte impregnated spacer enrolled therewith and separating the turns thereof, said roll having an end disposed adjacent the surface of said cathode and substantially parallel thereto.

SAMUEL RUBEN.

REFERENCES CITED

The following references are of record in the file of this patent:

UNITED STATES PATENTS

| Number | Name | Date |
|---|---|---|
| 313,615 | Platt | Mar. 10, 1885 |
| 940,043 | Morrison | Nov. 16, 1909 |
| 1,188,408 | Burgess | June 27, 1916 |
| 2,103,714 | Drummond | Dec. 28, 1937 |
| 642,953 | Blumenberg et al. | Feb. 6, 1900 |
| 732,842 | Gardiner | July 7, 1903 |
| 1,670,040 | McCabe | May 15, 1928 |
| 2,060,796 | Cahoon | Nov. 17, 1936 |
| 2,116,091 | Williams | May 3, 1938 |
| 1,211,363 | Burgess | Jan. 2, 1917 |
| 2,178,063 | Brooks et al. | Oct. 31, 1939 |
| 1,106,540 | Broad | Aug. 11, 1914 |
| 1,219,074 | Bronsted | Mar. 13, 1917 |
| 1,644,344 | Martus et al. | Oct. 4, 1927 |
| 2,257,129 | Ruben | Sept. 30, 1941 |

FOREIGN PATENTS

| Number | Country | Date |
|---|---|---|
| 129,423 | Great Britain | July 8, 1919 |
| 493,694 | Great Britain | Oct. 12, 1938 |
| 568 | Great Britain | 1910 |
| 399,561 | Great Britain | Oct. 9, 1933 |